Feb. 8, 1955  J. F. KOPCZYNSKI  2,701,433
MACHINE TOOL

Filed June 25, 1952  4 Sheets-Sheet 1

INVENTOR.
John F. Kopczynski
BY
Parker, Prochnow Farmer,
Attorneys.

Feb. 8, 1955 J. F. KOPCZYNSKI 2,701,433
MACHINE TOOL
Filed June 25, 1952 4 Sheets-Sheet 2
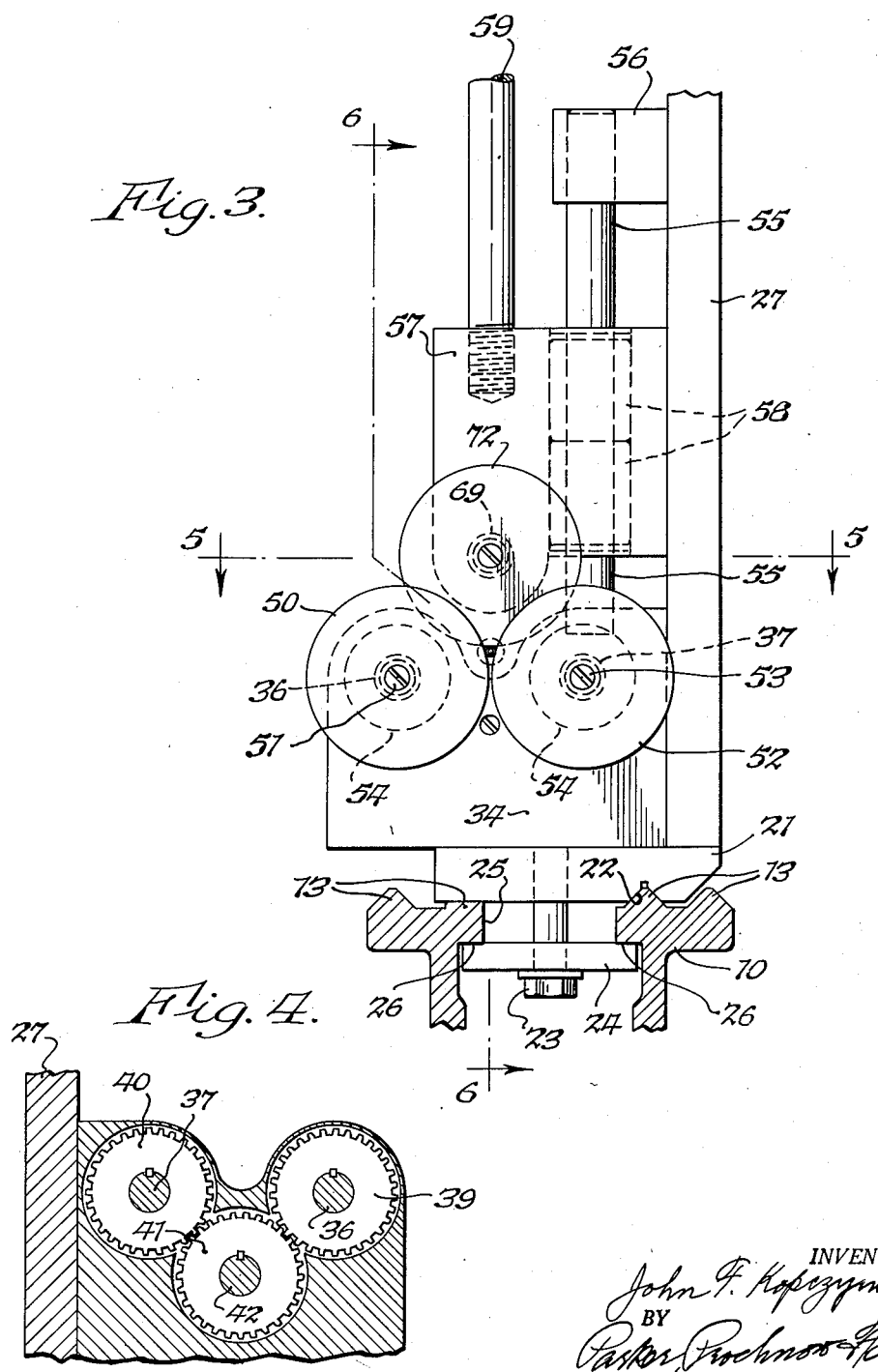

Feb. 8, 1955 J. F. KOPCZYNSKI 2,701,433
MACHINE TOOL
Filed June 25, 1952 4 Sheets-Sheet 3
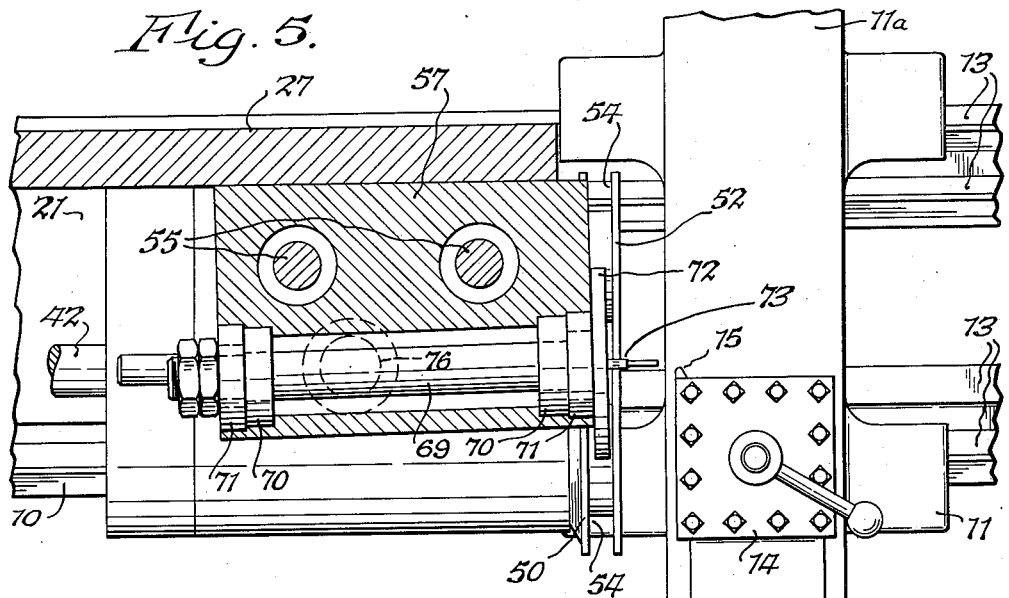
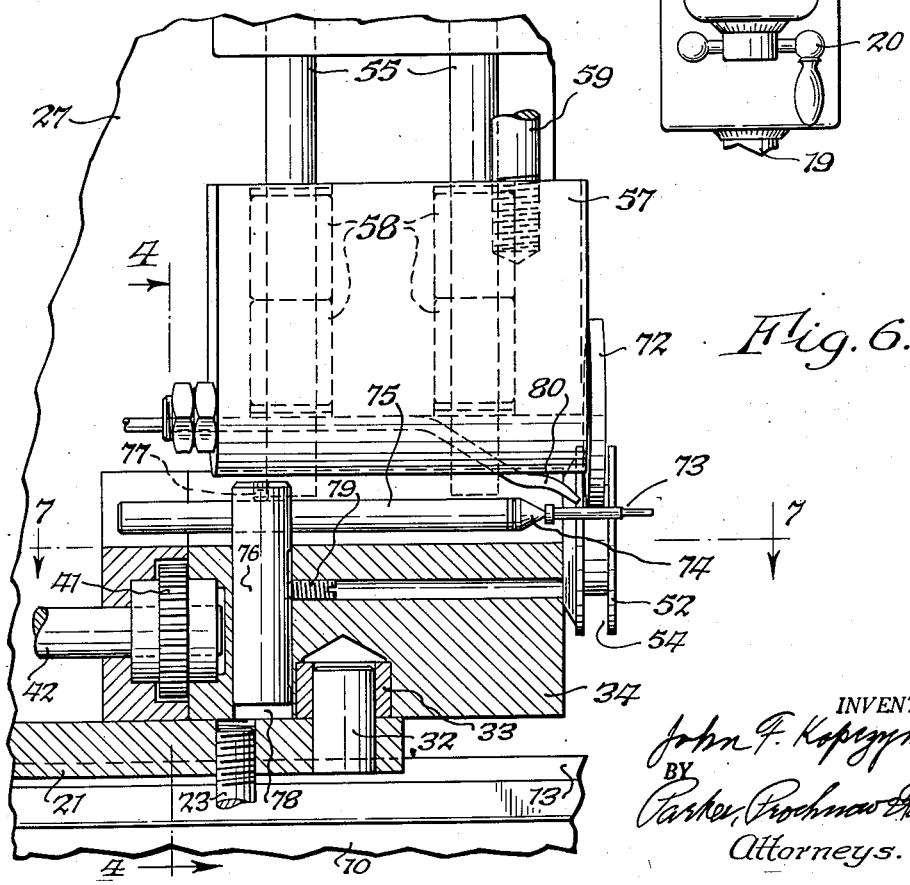
INVENTOR.
John F. Kopczynski
BY
Parker, Prochnow & Hanner,
Attorneys.

Feb. 8, 1955 — J. F. KOPCZYNSKI — 2,701,433
MACHINE TOOL
Filed June 25, 1952 — 4 Sheets-Sheet 4

INVENTOR.
John F. Kopczynski
BY
Parker, Brochmas Stanner
Attorneys.

United States Patent Office 2,701,433
Patented Feb. 8, 1955

2,701,433

MACHINE TOOL

John F. Kopczynski, Buffalo, N. Y.

Application June 25, 1952, Serial No. 295,460

20 Claims. (Cl. 51—236)

This invention relates to machine tools for mounting and rotating bodies about their longitudinal axes without damage to the periphery. They are sometimes called "centerless machine tools," and are particularly useful for mounting and rotating small cylindrical pins or objects which are to have their ends turned or ground down to a smaller diameter. An example of such pins are punches used in perforating sheet materials. Some of such objects have a head portion opposite from the smaller end, and by reason of the fact that these pins or punches are rather small, it is difficult to grip and chuck them, so as to hold them snugly, while rotating them about an axis which is the true central longitudinal axis. It is even more difficult to grind a small diameter on an end which is truly concentric with the shank of the punch, to the tolerances which are usually required by the industry. It is also difficult to grip and turn such pins without the pin slipping.

It has been proposed heretofore to use a mounting formed of two wheels and a pedestal where the pair of wheels center and drive the punch or pin to be ground against a stationary pedestal. The pedestal keeps the workpiece in position between the wheels but the workpiece has to rotate against the friction of the pedestal which absorbs power as well as being open to other objections. It is also difficult to use such a device for very small diameter objects because the necessary approach of the wheels and pedestal is not possible.

An object of this invention is to provide a machine tool which will successfully grip and rotate a wide variety of bodies to be operated upon, and even very small diameter bodies; which will not damage the objects so held and rotated; which will automatically center the objects when mounting them; which enables quick mounting and dismounting of bodies being operated upon; which automatically accommodates itself to bodies of different diameters; and which enables rapid and easy changes to increase the range of objects that may be mounted and rotated.

Another object is to provide a machine of this type in which a cooling agent can easily be delivered to the bodies so mounted and rotated, while it is being worked upon.

Another object is to provide a device of this type which, when the diameter of the body body varies within certain tolerances of diameter, the reduced end may still be cut or machined to a diameter which is within the tolerances permissible for that small diameter.

Another object is to provide a machine of this type which will permit heavy cuts or machinings to be taken without slippage between the driving wheels and the body being operated upon.

Another object is to provide an improved device for accomplishing all of these objects, which will be relatively simple, practical, compact, easily manipulated and inexpensive.

Various other objects and advantages will be apparent from the following description of an embodiment of the invention, and the novel features thereof will be particularly pointed out hereinafter in connection with the appended claims.

In the accompanying drawings:

Fig. 3 is a sectional end elevation of the same, the section being taken approximately along the line 3—3 of Fig. 1;

Fig. 4 is a transverse, sectional elevation through a part of the same, the section being taken approximately along the line 4—4 of Fig. 6;

Fig. 5 is a sectional plan of a portion of the same, the section being taken approximately along the line 5—5 of Fig. 3;

Fig. 6 is a longitudinal, sectional elevation through a portion of the same, the section being taken approximately along the line 6—6 of Fig. 3;

Figure 1:
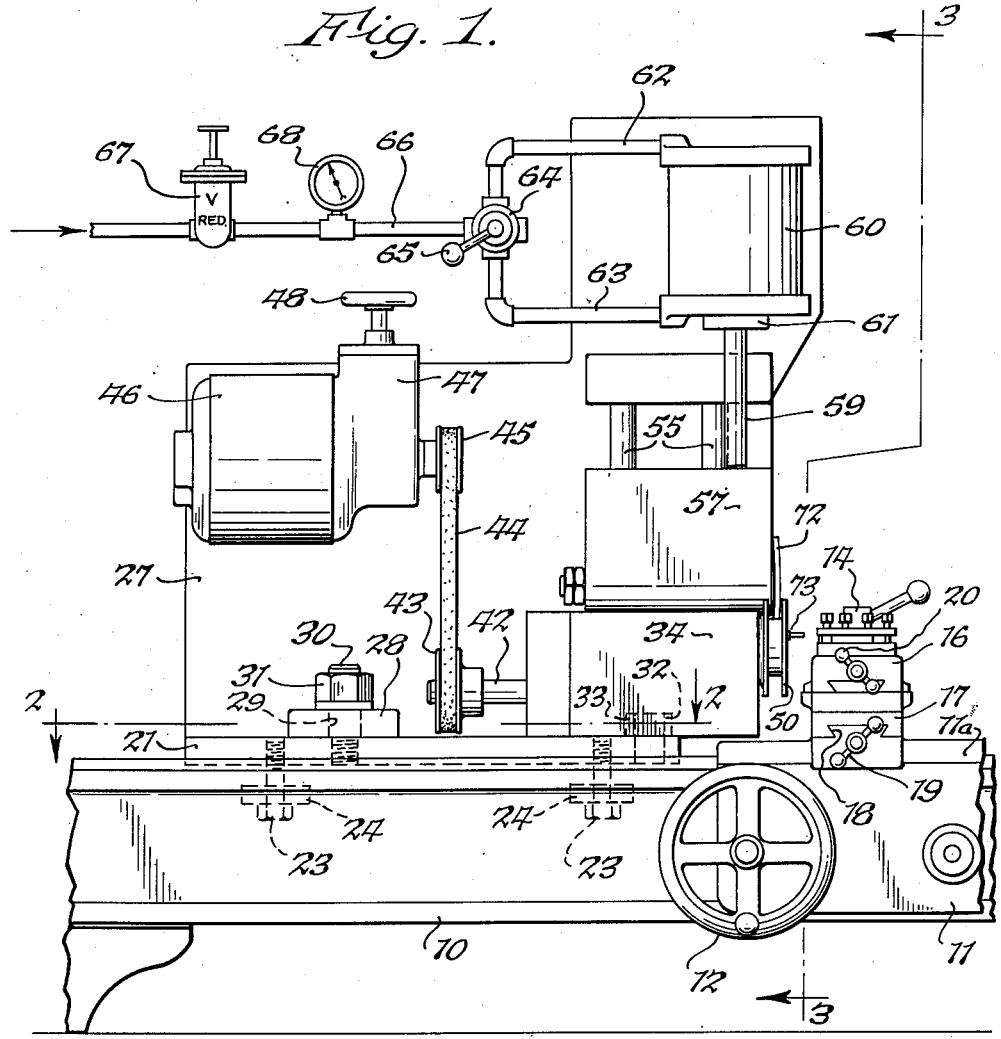
Fig. 1 is a front elevation of a device constructed in accordance with this invention.
Figure 8:
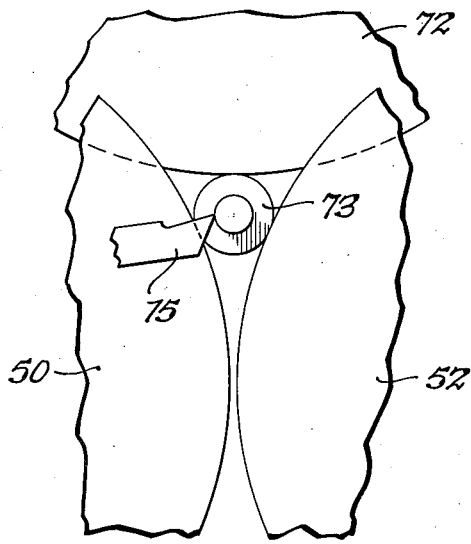
Figure 9:
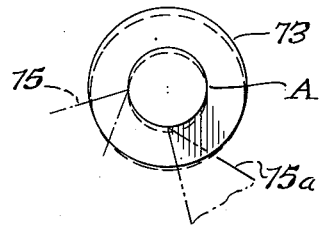

Fig. 8 is an elevation, approximately at the line 3—3 of Fig. 1, illustrating the manner in which a body to be operated upon is mounted and centered and rotated in accordance with this invention; and Fig. 9 is a diagram illustrating the manner in which accurate machining may be performed within close tolerances, even through the larger end by which the body is held may not be finished within close tolerances.

In the illustrated embodiment of the invention, a bed or base 10 (Fig. 1), somewhat resembling a lathe bed, serves as the foundation upon which the other parts may be mounted. A carriage 11, somewhat similar to a carriage on a lathe bed, is mounted on the base 10 for movement lengthwise along the base, by merely turning a hand wheel 12. The mechanism by which operation of the wheel 12 causes movement of the carriage 11 along the bed 10 is common in the lathe and machine tool art, and therefore, is not illustrated since the details thereof are per se no part of the present invention. This carriage 11 has a part 11a (Fig. 5) which extends across the top of the base and which rests upon the top of the base and by which it is guided, as usual in lathe carriages. The base 10, on its upper face, is provided with rails 13 (Fig. 3) similar to those on the top of a lathe bed. The part 11a of carriage 11 which extends across the base top has channels, not shown, in its underface which fit over the forward and the rearward rails so as to be guided thereby. Mounted upon the top of the carriage 11 is a turret 14 which holds any of several machine tools such as grinders or cutting tools 15, see Fig. 8. These tools are sometimes called "bits." The turret may be rotated or turned about a vertical axis into different angular positions on the carriage to enable various bits or tools to be brought against the work. The turret is mounted on a sub-carriage 16, which in turn, is mounted on a second sub-carriage 17. The sub-carriage 17 is mounted to slide forwardly and rearwardly on a guide 18 on the top 11a of the carriage. A worm and screw arrangement where the screw is turned by a handle 19, serves to force the sub-carriage 17 forward and rearwardly, that is, crosswise of the length of the base 10. Similarly, a screw operated by a handle 20 serves to force the sub-carriage 16 forwardly and rearwardly upon the sub-carriage 17 in a similar manner. The mechanism by which these handles will move the sub-carriages forwardly and rearwardly is common in lathes for the mounting of the cutting tools, and since they are well known in the art, their details have not been illustrated.

Figure 2:
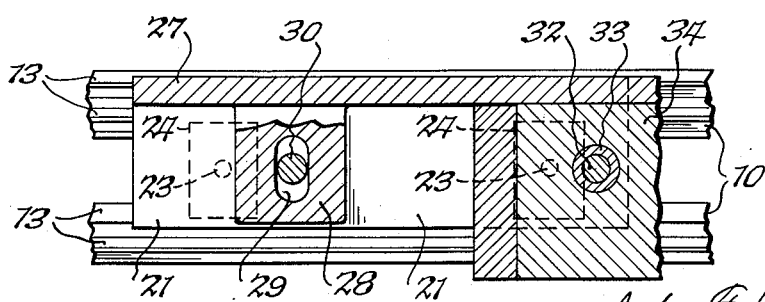
Fig. 2 is a sectional plan of a part of the same, the section being taken approximately along the line 2—2 of Fig. 1.

Mounted upon the top of the base or bed 10 is a plate or member 21, see Figs. 1, 2 and 3. This plate, in its underface, has a V-shaped groove 22 (Fig. 3), which fits over a V-shaped rail or rib 13 on the top of the bed 10. It serves to mount the plate 21 for sliding movement in a direction lengthwise of the base. Cap screws 23 (Figs. 1 and 3) pass upwardly through small plates 24 in an open slot 25 provided lengthwise of the base top, and are threaded into the underface of the plate 21. There are two or more such screws 23 and plates 24. The plates 24 engage against shoulders 26 on the lathe bed to make it possible for the heads of the nuts to draw the plate or member 21 tightly against the top of the bed or base 10 and clamp it in selected, adjusted positions along the length of the base 10.

An upright frame 27 (Figs. 1 and 2) is disposed above the plate or member 21, along its rear edge, and it is provided with a forwardly extending lug or arm 28 which slides over the upper face of member 21. This arm 28 is provided with a forwardly and rearwardly elongated slot 29, and a stud 30 extends upwardly from one end portion of the plate or member 21 through the slot 29 in the arm 28 and carries a nut 31 which may be tightened down against the arm 28 to clamp it to the top of member 21 and hold it against movement forwardly and rearwardly to the extent permitted by the slot 29. The other end of the plate or member 21 carries an upstanding pivot stud 32, see Fig. 6, and mounted on this pivot stud 32 is a bushing 33 provided in the underface of a bearing block 34 which is fixed along its rear side to the upstanding frame 27. Thus the frame 27 is pivoted for horizontal rocking movement on the stud 32 to the extent permitted by the slot 29. The purpose for this will appear later.

Figure 7:
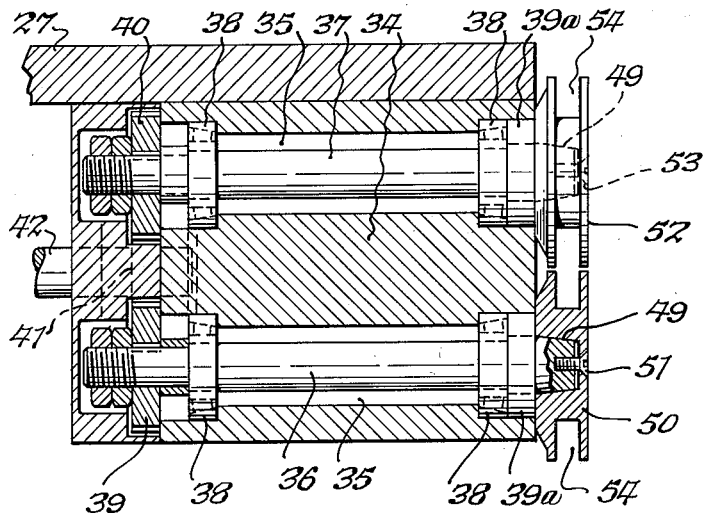
Fig. 7 is a sectional plan through a portion of the same, the section being taken approximately along the line 7—7 of Fig. 6.

The block 34 is provided with two horizontally extending recesses 35 (Fig. 7), in one of which is rotatably mounted a spindle 36 and in the other is rotatably mounted a spindle 37. The spindle 36 is rotatably supported at each end by bearings 38 of the tapered-roll type which may, if desired, be preloaded for accuracy. Seals 39a may be provided at the outer end of the recess exteriorly of the bearings 38, around each spindle 36 and 37. Spindle 37 is similarly rotatably supported in tapered-roll bearings 38. The spindle 36 at the inner end of the recess 35 has fixed thereon a gear 39, and similarly the spindle 37 at its inner end has fixed thereon a gear 40. These two gears 39 and 40 mesh with and are driven by a gear 41 which is fixed on a shaft or spindle 42 that extends from that end of the block 34. The shaft 42 (Fig. 1) may be considered a drive shaft, and it carries a pulley 43 which is driven by a flexible belt 44 from a pulley 45. The pulley 45 is driven by a motor 46 through an adjustable, speed reduction device 47. These speed reduction devices are known in the industry and available in the open market, so that the details thereof are not illustrated. The speed at which the motor 46 drives the pulley 45 through the speed reducing device 47 may be varied by turning the handle 48. Thus when the motor operates, it drives the spindles 36 and 37 both in the same direction, which would be clockwise in Fig. 3. The outer end of each spindle 36 and 37 is slightly tapered at 49. A wheel 50 (Fig. 7) having tapered socket in one end face fits over the tapered end 49 of the spindle 36, so as to be frictionally driven thereby, and this wheel 50 is confined on the tapered end 49 by a screw 51 which passes through the end face of the wheel 50 and is threaded into the outer end of the spindle 36. The taper on the end 49 may be similar to that known as the Morse taper, used in general lathe work, so that no keying is necessary. Another and similar wheel 52 is similarly confined on the tapered end 49 of the spindle 37 by the screw 53. These two wheels 50 and 52 are disposed side by side and alined with each other in a direction from front to rear, and each has a peripheral groove 54, see Fig. 7.

A pair of posts or rods 55 (Fig. 3) extend vertically in front of frame 27 from a block 56 that extends forwardly from the frame 27 near the top thereof to the block 34. Slidingly mounted on these rods 55 is an adjustable bearing block 57. These rods 55 (Figs. 5 and 6) pass through vertical passages in the block 57, and the passages are provided with ball bushings 58 arranged in tandem in each passage. These ball bushings are pressed into these vertical passages in the block 57. Seals may be provided at the outer ends of these ball bushings 58, if desired. These ball bushings are available in the open market, and are used to provide frictionless sliding movement wherever rectilinear motion is required. They provide not only low friction but precision mounting, and since they are a product purchased in the open market, their details are not illustrated.

A piston rod 59 (Fig. 1) is threaded into the block 57 forwardly of the guide rods 45, and extends upwardly through a stuffing box 61 into a cylinder 60. Within the cylinder 60, the piston rod 59 is provided with a piston that slides in close engagement with the walls of the cylinder. Pipes 62 and 63 open into the cylinder chamber at the opposite ends of the cylinder, and these pipes are connected to a valve 64 having an operating handle 65. When the handle 65 is in one position, it connects a supply pipe 66 to the pipe 62, and vents the pipe 63. When the handle 65 is turned into its other position, it connects pipe 66 to pipe 63 and vents the pipe 62. The pipe 66 is connected to a source of compressed air, through a reducing valve 67, and a pressure gauge 68 is connected to the pipe 66 between the reducing valve 67 and the manually controlled valve 64. Thus, compressed air may be delivered alternately to the ends of the cylinder 60, so as to force the piston therein endwise, and through the piston rod 59 shift the block 57 vertically, that is, toward and from the block 34.

Within the block 57 is a spindle 69, see Fig. 5, which is rotatably mounted therein by tapered-roll bearings 70, and bearing seals 71, may be provided outwardly from each of these bearings. One end of the spindle 69 mounts a disc-shaped wheel 72 having a thickness less than the width of the groove 54 in each of the wheels 50 and 52. The longitudinal axis of shaft 69 makes a slight angle to the longitudinal axes of the spindles 36 and 37 for a purpose which will appear presently. The wheel 72 can enter the grooves 54 in the wheels 50 and 52 and thus mount between the peripheries of these wheels the shank of a body or object 73 which is to be operated upon. Since the wheels 50 and 52 are positively driven in the same direction, and the body 73 is confined between them by the disc wheel 72 which is free to rotate, the body 73 will be centered, held and rotated between three wheels 50, 52 and 72. The tool 15 may then be advanced against the smaller end of the body 73 to machine it and it is so mounted that it will approach the center of rotation of the body. If the body 73 is larger, the tool will still approach it in a horizontal plane which passes through the axis of rotation of the body.

As explained above, the shaft 69 makes a slight angle with the center lines of spindles 36 and 37. This angularity which is imparted to the disc wheel 72, urges the body 73 to the left in Fig. 6, and an anti-friction bearing pad 74 is disposed at the end of the body 73 so as to limit this movement toward the left which is urged by the angularity in the position of wheel 72. This pad 74 is confined by anti-friction bearings to the end of a stop rod 75 which extends through a post 76 and is adjustably confined therein by a set screw 77, Fig. 6. The post 76 is mounted in the block 34 to slide vertically in a recess 78. The post 76 may be held in any vertically adjusted position by a set screw 79, that is provided in the block 34. Thus, the bearing pad 74 may be adjusted angularly, upwardly, and also endwise by releasing the set screws 77 and 79. When the driving wheels 50 and 52 are rotating clockwise, the idling wheel 72 will also be rotating in a clockwise direction but at the same time, because of its frictional angular engagement with the body 73 being operated upon, it will urge this body 73 to the left in Fig. 6 against the bearing pad 74 and thus keep it in proper lengthwise adjustment. When the body 73 has been machined or operated upon, one merely operates the valve 64 to elevate the block 57, and the idler wheel 72 which is carried thereby releases the body 73 so that it may be removed and a new one to be operated upon placed between the wheels 50 and 52. The valve 64 is then operated to cause descent of the block 57 which returns the wheel 72 into position for engagement with the body 73. If the object or body 73 is small, the wheel 72 may enter the grooves 54 in order to engage the small diameter body 73. With this arrangement one has two positive driving rolls or wheels 50 and 52 which rotate the workpiece or body to be operated upon, and the idler wheel 72 holds the body 73 in good frictional contact with the wheels 50 and 52, and endwise against the adjustable stop pad 74. It will be noted that considerable air space is left around the body 73, and a tube 80 from a source of cooling fluid is disposed to discharge a stream of cooling fluid against the body 73 being worked upon. It also serves to flush away chips and particles which are removed in the machining operation.

It will be understood that a grinding wheel or other tool can be substituted for the tool or bit 15, and that the bit could be turned up-side-down and the direction of rotation reversed so that the chips would fall down directly instead of being removed on the top of the tool. As will be observed from Fig. 9 in full lines, the body 73 is of slightly larger size than that indicated by the dotted lines. A smaller body 73 such as shown by the dash lines in Fig. 9, would set slightly lower between the wheels 50 and 52 than would the larger one shown by the full line in Fig. 9, but because the body 73 is working between the two wheels 50 and 52 and it drops vertically, the smaller end A of the body 73 will not vary in dimension very greatly because of its vertical movement. If the tool bit 15 was cutting in the position shown by the dash lines 15a in Fig. 9, even a slight downward movement of the body 73 would result in a very large change in the machining of the small end A of the body. When the tool 15 is disposed as shown by dot and dash lines in Fig. 9, where the point of the tool is approximately in a horizontal plane through the axis of rotation of the body 73, a slight downward movement of the body would not cause any large variation to which the small end of the body 73 is machined.

Where the small end of the body 73 being operated upon is a taper, one merely loosens the nut 31, rocks the upright frame 27 on the pivot stud 32 for a small angle which so places the body that its longitudinal axis makes a small angle to the length of the base 10. Thus movement of the carriage 11 will machine a taper on the body instead of a cylindrical surface.

It is believed that the operation of the device will be understood from the foregoing description, but will be briefly summarized. One operates the valve 64 to elevate the block 57 which elevates the idler wheel 72. One then places the body 73 to be machined into the space between the two wheels 50 and 52, as shown in Fig. 8. The valve 64 is then operated to cause a descent of the block 57 to place the wheel 72 in engagement with body 73 and confine it against the wheels 50 and 52, with a pressure determined by the setting of the reducing valve 67. The motor 46 is rotated which causes rotation of the body 73, and then the carriage 11 is manipulated and the tool 15 adjusted thereon, so as to perform the desired machining operation on the body. A taper may be machined on the body 73 by shifting the upright frame 27 about the pivot stud 32. After the machining operation has been completed, the valve 64 may be operated to elevate the block 57 and permit substitution of a new body 73.

It will be understood that various changes in the details and arrangements of parts, which have been herein described and illustrated in order to explain the nature of the invention, may be made by those skilled in the art within the principle and scope of the invention as expressed in the appended claims.

I claim as my invention:

1. A centerless machine tool comprising a pair of peripherally grooved wheels disposed side by side and mounted for rotation about parallel axes, a connection to each of said wheels for rotating them in the same direction, a third wheel disposed side by side with the other two wheels to make a triangle of wheels, means mounting said third wheel for free rotation on its own axis and for bodily movement toward and from said pair of wheels, means for causing such bodily movement of said third wheel and holding it advanced under a selected pressure, said third wheel having a peripheral margin of a thickness less than the width of the grooves in said pair of wheels, to enable it to enter said grooves and thus approach more closely to said pair of wheels, and grip an object to be operated upon between the three wheels, and a tool mounted to engage and operate upon any object so confined between said wheels and rotated with said wheels.

2. A centerless machine tool comprising a pair of peripherally grooved wheels disposed side by side and mounted for rotation about parallel axes, a connection to each of said wheels for rotating them in the same direction, a third wheel disposed side by side with the other two wheels to make a triangle of wheels, means mounting said third wheel for free rotation on its own axis and for bodily movement toward and from said pair of wheels, means for causing such bodily movement of said third wheel and holding it advanced under a selected pressure, said third wheel having a peripheral margin of a thickness less than the width of the grooves in said pair of wheels, to enable it to enter said grooves and thus approach more closely to said pair of wheels and grip an object to be operated upon between the three wheels, the axis of rotation of said third wheel making a small angle to each of the axes of rotation of the wheels of said pair, a stop disposed for engagement by any object gripped between the peripheries of said wheels, to limit endwise movement of such object, and a tool mounted to engage and operate upon any object so confined between said wheels and rotated with said wheels.

3. A centerless machine for mounting and rotating an object to be operated upon, comprising a pair of spindles disposed side by side in parallel relation, a block supporting said spindles for rotation about their longitudinal axes, a peripherally grooved wheel axially mounted on and fixed to each of said spindles at corresponding ends thereof, with the grooves of the wheels alined with each other, means for rotating said spindles in the same direction, a third spindle having on one end thereof a wheel with a cylindrical periphery of substantial width in a direction parallel to its axis but less than the width of the grooves in the peripheries of said other wheels so as to enter said grooves to enable it to enter freely into said grooves in the other wheels, and center an object to be worked upon and hold it for rotation, means mounting said third spindle in a position side by side with the other spindles, for rotation on its own longitudinal axis, and also for bodily movement in a direction transverse to its axis of rotation toward and from said grooved wheels, so as to grip said object between said three wheels and rotate it about its longitudinal axis, and a tool mounted separately from said wheels and movable to engage and work on said object while that object is held between said three wheels and rotated thereby.

4. A centerless machine for mounting and rotating an object to be operated upon, comprising a pair of wheels disposed side by side, with their peripheries close to each other and alined, means mounting said wheels for rotation in the same direction, a member mounted for bodily movement toward and from said wheels from one side thereof, a third wheel carried by said member for bodily movement therewith and for rotation about its axis, with that axis nearly but not quite parallel to said axes of rotation of said pair of wheels, means connected to said pair of wheels for rotating them in the same direction, whereby when said object is confined between said three wheels, it will be centered and rotated on its own axis by said wheels, two of said wheels having peripherally extending lands spaced apart in directions lengthwise of the wheels, with the peripheral portion of the other wheel running in the spaces between the lands of said two wheels, and having a cylindrical periphery of substantial width in a direction parallel to its axis of rotation, but less than the distance between the said lands of each of the other two wheels, that confines said object against said two wheels for rotation with all of said wheels, and a stop disposed at one end of said object, while it is confined between said wheels, for limiting endwise movement of said object that is caused by a non-parallel position of said axis of rotation of said third wheel relatively to said axes of rotation of said pair of wheels.

5. A centerless machine for mounting and rotating an object to be operated upon, comprising a pair of wheels disposed side by side, with their peripheries close to each other and alined, means mounting said wheels for rotation in the same direction, a member mounted for bodily movement toward and from said wheels from one side thereof, a third wheel carried by said member for bodily movement therewith and for rotation about its axis, with that axis generally parallel to said axes of rotation of said pair of wheels, means connected to said pair of wheels for rotating them in the same direction, whereby when said object is confined between said three wheels, it will be centered and rotated on its own axis by said wheels, two of said wheels having peripherally extending lands spaced apart in directions lengthwise of the wheels, with the peripheral portion of the other wheel running in the spaces between the lands of said two wheels, the axis of rotation of said third wheel making a small angle with the axes of the pair of wheels, and a stop disposed adjacent the wheels in back of the space between the wheels, to stop endwise movement of said object during its rotation.

6. A centerless machine for mounting and rotating an object, comprising a pair of wheels disposed side by side, with their peripheries close to each other and alined, means mounting said wheels for rotation in the same direction, a member mounted for bodily movement toward and from said wheels from one side thereof, a third wheel carried by said member for bodily movement therewith and also for rotation about its axis, with that axis generally parallel to said axes of rotation of said pair of wheels, means connected to said pair of wheels for rotating them in the same direction, whereby when said object is confined between said three wheels, it will be centered and rotated on its own axis by said wheels, the wheels of said pair having peripheral channels alined with each other, and the periphery of the third wheel having a portion of a width to enter said channels of said pair of wheels when said third wheel moves close to said pair of wheels, an element disposed to engage any body being held and rotated by said wheels, and a carriage mounting said element and operable to move said element toward and from the axis of rotation of said body and also generally parallel to the axis of rotation of said body, said wheel mounting means and said member being adjustable together to shift all of said wheels until their axes of rotation are at an angle to the direction of said generally parallel movement of said carriage.

7. A centerless machine for mounting and rotating an object to be operated upon, comprising a base, a carriage mounted on said base for movement along it, a member also secured on said base, a frame pivoted on the top of said member with its pivot at its end nearest said carriage, means for holding the frame in different positions, in which it may be adjusted on its pivot, a pair of spindles disposed side by side on said frame and mounted for rotation thereon, wheels detachably fixed on corresponding ends of said spindles and having their peripheries close to one another and alined, a block mounted on said frame for movement toward and from said spindles, a third spindle rotatably mounted on said block in a position generally parallel to, and side by side with, both of said pair of spindles, a third wheel fixed to an end of said third spindle, with its periphery alined with and in close proximity to the peripheries of the other wheels, a driving connection to said pair of spindles for rotating them in the same direction on their axes, means for pressing said block toward said pair of spindles, under a selected pressure, whereby said object disposed between said wheels will be held thereby and rotated on its own axis by the rotation of said pair of spindles, and means on said carriage for mounting a tool thereon in a position to operate on said rotating object.

8. A centerless machine for mounting and rotating an object to be operated upon, comprising a base, a carriage mounted on said base for movement along it, a member also secured on said base, a frame pivoted on the top of said member with its pivot at its end nearest said carriage means for holding the frame in different positions, in which it may be adjusted on its pivot, a pair of spindles disposed side by side on said frame and mounted for rotation thereon, wheels detachably fixed on corresponding ends of said spindles and having their peripheries close to one another and alined, a block mounted on said frame for movement toward and from said spindles, a third spindle rotatably mounted on said block in a position generally parallel to, and side by side with, both of said pair of spindles, a third wheel fixed to an end of said third spindle, with its periphery alined with and in close proximity to the peripheries of the other wheels, a driving connection to said pair of spindles for rotating them in the same direction on their axes, means for pressing said block toward said pair of spindles under a selected pressure, whereby said object disposed between said wheels will be held thereby and rotated on its own axis by the rotation of said pair of spindles, and means on said carriage for mounting a tool thereon in a position to operate on said rotating object, said tool mounting means having a part thereof adjustable relatively to the balance thereof to move the tool toward and from the axis of rotation of said object.

9. A centerless machine for mounting and rotating an object to be operated upon, comprising a base, a member secured on said base and adjustable therealong, a frame pivoted near one end to said member, so as to swing horizontally thereon, means for securing said frame in different angular positions in its swinging movement, a block fixed on said frame near said pivoted end, a pair of wheels disposed in upright positions side by side and in alinement with each other at an end of said block, means on said block for mounting said wheels for rotation about approximately horizontal, parallel axes, a driving connection to said wheels for rotating them simultaneously in the same direction, an upright third wheel disposed in side by side alinement with said pair of wheels with its central axis also approximately horizontal, a support on said frame carrying said third wheel for rotation about its central axis, and movable bodily with said third wheel toward and from said pair of wheels to mount said object between said wheels or release it, means on said frame for yieldingly urging said support and third wheel towards said pair of wheels to clamp said object between the three wheels under a selected pressure, a carriage movable in a direction parallel to the axis of rotation of said object when it is held between said wheels, and a tool holder on said carriage movable toward and from said axis of rotation of said object.

10. A centerless machine for mounting and rotating an object to be operated upon, comprising a base, a member secured on said base and adjustable therealong, a frame pivoted near one end to said member so as to swing horizontally thereon, means for securing said frame in different angular positions in its swinging movement, a block fixed on said frame near said pivoted end, a pair of wheels disposed in upright positions side by side and in alinement with each other at an end of said block, means on said block for mounting said wheels for rotation about approximately horizontal, parallel axes, a driving connection to said wheels for rotating them simultaneously in the same direction, an upright third wheel disposed in side by side alinement with said pair of wheels with its central axis also approximately horizontal, a support on said frame carrying said third wheel for rotation about its central axis, and movable bodily with said third wheel toward and from said pair of wheels to mount said object between said wheels or release it, means on said frame for yieldingly urging said support and third wheel towards said pair of wheels to clamp said object between the three wheels under a selected pressure, a carriage movable in a direction parallel to the axis of rotation of said object when it is held between said wheels, a tool holder on said carriage movable toward and from said axis of rotation of said object, said third wheel having its axis of rotation disposed at a small angle to the axes of rotation of the pair of wheels, and a stop disposed at the axis of rotation of said object at the opposite faces of said wheels from said tool holder, for limiting endwise movement of said object while said object is held and rotated by said wheels.

11. A centerless machine for mounting and rotating an object to be operated upon, comprising a base, a member secured on said base and adjustable therealong, a frame pivoted near one end to said member, so as to swing horizontally thereon, means for securing said frame in different angular positions in its swinging movement, a block fixed on said frame near said pivoted end, a pair of wheels disposed in upright positions side by side and in alinement with each other at an end of said block, means on said block for mounting said wheels for rotation about approximately horizontal, parallel axes, a driving connection to said wheels for rotating them simultaneously in the same direction, an upright third wheel disposed in side by side alinement with said pair of wheels with its central axis also approximately horizontal, a support on said frame carrying said third wheel for rotation about its central axis, and movable bodily with said third wheel toward and from said pair of wheels, to mount said object between said wheels or release it, an air cylinder on said frame for yieldingly urging said support and third wheel towards said pair of wheels to clamp said object between the three wheels under a selected pressure, a carriage movable in a direction parallel to the axis of rotation of said object when it is held between said wheels, and a tool holder on said carriage movable toward and from said axis of rotation of said object.

12. A centerless machine for mounting and rotating an object to be operated upon, comprising a base, a member secured on said base and adjustable therealong, a frame pivoted near one end to said member, so as to swing horizontally thereon, means for securing said frame in different angular positions in its swinging movement, a block fixed on said frame near said pivoted end, a pair of wheels with longitudinally spaced apart, peripheral rims disposed in upright positions side by side and in alinement with each other at an end of said block, means on said block for mounting said wheels for rotation about approximately horizontal, parallel axes, a driving connection to said wheels for rotating them simultaneously in the same direction, an upright third wheel disposed in side by side alinement with said pair of wheels, having a peripheral rim of a thickness less than the distance between the rims of said pair of wheels and alined with the space between the rims of each of said pair of wheels so as to be able to enter said space, with its central axis also approximately horizontal, a support on said frame carrying said third wheel for rotation about its central axis, and movable bodily with said third wheel toward and from said pair of wheels, to mount said object between said wheels or release it, means on said frame for yieldingly urging said support and third wheel towards said pair of wheels to clamp said object between the three wheels under a selected pressure, a carriage movable in a direction parallel to the axis of rotation of said object when it is held between said wheels, and a tool holder on said carriage movable toward and from said axis of rotation of said object.

13. A chuck for mounting and rotating an object to be operated upon, comprising three wheels arranged in a triangular order and disposed side by side, means mounting said wheels for rotation individually on approximately parallel axes, a driving connection to one of said wheels to rotate it on its own axis, means for shifting another of said wheels toward and from a plane containing the axes of the other of said wheels, so as to grip or release said object to be operated upon, the peripheries of each of two of said wheels having longitudinally spaced rims, and the peripheral rim of the other wheel being cylindrical with a substantial width in a direction parallel to its axis of rotation, but less than the distance between the rims of each wheel so as to be able to enter the spaces between the rims of the other wheels, the axis of rotation of said other wheel deviating slightly from a position in which it would be parallel to the axes of rotation of the other two wheels, so as to cause a force, during, urging said objects endwise in one direction, and a stop limiting said endwise movement of said object.

14. A centerless machine for mounting and rotating an object to be operated upon, comprising a base having guides on its top running in a direction from end to end thereof, a tool holder, means carrying said holder, mounted on top of and movable along said guides on said base in a direction from end to end of the base, and having its tool mounting portion movable in a direction crosswise of its movement along the base, a frame mounted on said guides and secured to said base, but adjustable along the guides and having a wall rising above said base adjacent the rear side thereof, a pair of spindles disposed side by side but spaced apart, in front of said wall on said frame, means connected to said wall and rotatably mounting said spindles, means on said frame for rotating said spindles in the same directions and at the same speeds, a wheel carried on an end of each spindle and having longitudinally spaced rims forming its periphery, with these wheels having their peripheries in side by side alinement, a third wheel also disposed in side by side alinement to said spindle-carried wheels, and having a cylindrical periphery of substantial width but small enough to pass between the rims on each of the other wheels and thereby enable a relatively close approach of said third wheel towards the other two of said wheels, so as to mount an object to be worked upon between the three wheels and automatically center it and hold it centered as it rotates, supporting means rotatably mounting said third wheel for idle rotation about an axis generally parallel to the axes of rotation of said spindles, means carried by said wall and mounting said supporting means for movement toward and away from said spindles so as to carry said third wheel toward and from the other two wheels and engage and releasably hold between them an object to be worked upon, and means carried by said wall for moving said supporting means toward and away from said spindles and yieldingly urging it toward said spindles under a selected pressure.

15. A centerless machine for mounting and rotating an object to be operated upon, comprising a base, a tool holder, means carrying said holder, mounted on top of and movable along said base, and having its tool mounting portion movable in a direction crosswise of its movement along the base, a frame secured to said base and having a wall rising above said base from the rear side thereof, a pair of spindles disposed side by side but spaced apart in front of said wall on said frame, means rotatably mounting said spindles, means on said frame for rotating said spindles in the same directions and at the same speeds, a wheel carried on an end of each spindle, with these wheels having their peripheries in side by side alinement and peripherally grooved, a third wheel also disposed in side by side alinement to said spindle-carried wheels and having a cylindrical periphery of substantial width in a direction parallel to its axis of rotation, but less than the widths of the grooves in the other two wheels, so as to mount an object to be worked upon between the three wheels, supporting means rotatably mounting said third wheel for idle rotation about an axis generally parallel to the axes of rotation of said spindles, means carried by said wall and mounting said supporting means for movement toward and away from said spindles so as to carry said third wheel toward and from the other two wheels and engage and releasably hold between them an object to be worked upon, and means carried by said wall for moving said supporting means toward and away from said spindles and yieldingly urging it toward said spindles under a selected pressure, and means by which said frame is selectively rockable about a pivot on said base which extends in a direction crosswise of the two directions of movement of said tool holder on said base.

16. A chuck for mounting and rotating an object to be operated upon, comprising three wheels arranged in a triangular order, with their axes approximately parallel, means mounting each of said wheels for rotation on its own axis, means for causing relative approach and separation between one of said wheels and the other wheels in directions crosswise of their axes, so as to grip and hold, between the peripheries of said wheels, an object to be centered and rotated, by said relative approach of said one wheel and the other wheels, and to release said object upon said relative separation of said one wheel and the other wheels, a driving connection to one of said wheels for rotating it upon its own axis, so as to rotate an object confined between the peripheries of the wheels, the circumferential peripheries of each of two of said wheels having peripheral rims spaced apart in a direction parallel to the axis of that wheel, and the circumferential periphery of the third of said wheels being cylindrical and of substantial width in a direction parallel to its axis of rotation, but less than the distance between the rims of each of the other two wheels, and said third wheel being disposed along its axis of rotation in a position for its circumferential periphery to enter the space between the rims of each of the other two wheels when the wheels relatively approach each other, whereby the wheels can closely approach each other and hold and rotate very small objects to be operated upon, the axis of said third wheel making a small angle to the position it would have if it was truly parallel to the axes of rotation of the other two wheels, so that said third wheel will also urge endwise an object held between the wheels, and a stop disposed for limiting such endwise movement of said objects so held.

17. A chuck for mounting and rotating an object to be operated upon, comprising three wheels arranged in a triangular order, with their axes generally parallel, means mounting each of said wheels for rotation on its own axis, means for causing approach and separation of one of said wheels relatively to the others in directions crosswise of their axes so as to grip and hold between the peripheries of said wheels, an object to be centered and rotated, by such relative approach between one of the wheels and the other wheels, and to release said object upon such relative separation of the wheels, a driving connection to one of said wheels for rotating it upon its own axis, so as to rotate an object confined between the peripheries of the wheels, the circumferential peripheries of each of two of said wheels having peripheral rims spaced apart in a direction parallel to the axis of that wheel, and the circumferential periphery of the third of said wheels being cylindrical and of substantial width in a direction parallel to its axis of rotation, but less than the distance between the rims of each of the other two wheels, and said third wheel being disposed along its axis of rotation in a position for its circumferential periphery to enter the space between the rims of each of the other two wheels when one of the wheels relatively approaches the others, whereby such relative approach of the wheels will hold and rotate very small objects to be operated upon, means for causing such relative approach between one of said wheels and the other wheels to center and hold an object under a selected pressure, and for causing relative separation of said one wheel and the other wheels to release an object that had been centered and held, a tool disposed endwise beyond said wheels, and means mounting said tool to move along and work upon said object when the latter is held and rotated by said wheels.

18. A centerless machine tool comprising a pair of wheels disposed side by side and each having a peripheral channel, the channels of the wheels being alined with each other, means mounting each wheel for rotation about its longitudinal axis, said axes being parallel to each other, a third wheel disposed side by side with said pair of wheels to make a triangle of wheels, means mounting said third wheel for rotation about its longitudinal axis which is nearly but not quite parallel to said axes of said pair of wheels, said third wheel having a cylindrical periphery of substantial width in a direction parallel to its axis of rotation, but less than the width of the peripheral channel in each of said pair of wheels, and in a position to enter said channels in said pair of wheels when there is relative bodily approach between it and said pair of wheels in a direction crosswise of their axes of rotation, means for causing such bodily relative approach and separation of said wheels to selectively decrease and increase the size of the triangle formed by the wheels and receive and releasably hold between the peripheries of the wheels and rotate an object to be centered and rotated, a driving connection to one of said wheels to rotate it, and through it rotate an object confined and centered between the peripheries of said wheels, and a stop disposed at one end of said object, when that object is held by said wheels, to oppose endwise movement of said object as caused by said non-parallel position of said third wheel.

19. A centerless machine tool comprising a pair of wheels disposed side by side and each having a peripheral channel, the channels of the wheels being alined with each other, means mounting each wheel for rotation about its longitudinal axis, said axes being parallel to each other, a third wheel disposed side by side with said pair of wheels to make a triangle of wheels, means mounting said third wheel for rotation about its longitudinal axis which is nearly but not entirely parallel to said axes of said pair of wheels, said third wheel having a cylindrical periphery of substantial width in a direction parallel to its axis of rotation, but less than the width of the peripheral channel in each of said pair of wheels, and in a position to enter said channels in said pair of wheels when said pair of wheels and said third wheel relatively approach each other in a direction crosswise of their axes of rotation, means for causing bodily such relative approach and separation between said pair of wheels and said third wheel to selectively decrease and increase the size of the triangle formed by the wheels and receive and releasably hold between the peripheries of the wheels an object to be centered and rotated, and a driving connection to one of said wheels to rotate it, and through it rotate an object confined and centered between the peripheries of said wheels, the axis of said third wheel being just slightly off parallel relation to the axis of the pair of wheels so that rotation of said third wheel will urge said object that is confined between and rotated by the wheels, bodily in a selected direction endwise of its axis of rotation, a stop disposed in a position for limiting such movement of said confined object in said selected direction, and a tool mounted for movement endwise along said object when so held and rotated, and in machining relation to said object.

20. A centerless machine tool comprising a pair of wheels disposed side by side and each having a peripheral channel, the channels of the wheels being alined with each other, a pair of rotatably mounted, parallel shafts disposed side by side but spaced apart, said wheels being mounted on corresponding ends of said shafts, a third shaft mounted to rotate and movable toward and from a plane containing the axes of said pair of shafts, a third wheel disposed side by side with said pair of wheels to make a triangle of wheels, means mounting said third wheel for rotation about its longitudinal axis which is nearly but not entirely parallel to said axes of said pair of wheels, said third wheel having a cylindrical periphery of substantial width in a direction parallel to its axis of rotation, but less than the width of the peripheral channel in each of said pair of wheels, and in a position to enter said channels in said pair of wheels when it approaches said pair of wheels in a direction crosswise of their axes of rotation, means for causing such bodily movement of said third wheel to selectively decrease and increase the size of the triangle formed by the wheels and receive and releasably hold between the peripheries of the wheels an object to be centered and rotated, with a part thereof projecting beyond the wheels at the opposite face of said wheels from said shafts, a driving connection to one of said wheels to rotate it, and through it rotate said object when it is confined and centered between the peripheries of said wheels, and a tool disposed at the opposite faces of said wheels from said shafts and mounted to move along and work upon said held and rotated object.

References Cited in the file of this patent

UNITED STATES PATENTS

| Number | Name | Date |
|---|---|---|
| 1,042,998 | Blackmore | Oct. 29, 1912 |
| 1,858,235 | Briney | May 17, 1932 |
| 2,003,713 | Highberg | June 4, 1935 |
| 2,025,881 | McGhee et al. | Dec. 31, 1935 |
| 2,329,301 | Schmidt et al. | Sept. 14, 1943 |
| 2,330,809 | Cramer | Oct. 5, 1943 |
| 2,411,972 | Melin | Dec. 3, 1946 |
| 2,433,455 | Hutchinson | Dec. 30, 1947 |
| 2,544,318 | Horberg | Mar. 6, 1951 |